United States Patent
Misaki

(10) Patent No.: US 10,532,437 B2
(45) Date of Patent: Jan. 14, 2020

(54) PRODUCTION LINE

(71) Applicant: NSK Ltd., Tokyo (JP)

(72) Inventor: Kei Misaki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/759,951

(22) PCT Filed: Dec. 16, 2016

(86) PCT No.: PCT/JP2016/087553
§ 371 (c)(1),
(2) Date: Mar. 14, 2018

(87) PCT Pub. No.: WO2017/104804
PCT Pub. Date: Jun. 22, 2017

(65) Prior Publication Data
US 2019/0047098 A1 Feb. 14, 2019

(30) Foreign Application Priority Data
Dec. 18, 2015 (JP) ................ 2015-247313

(51) Int. Cl.
*B23P 19/00* (2006.01)
*B23P 21/00* (2006.01)
(Continued)

(52) U.S. Cl.
CPC ............ *B23P 21/004* (2013.01); *B23P 19/00* (2013.01); *B23P 19/04* (2013.01); *G05B 19/042* (2013.01); *G05B 2219/2621* (2013.01)

(58) Field of Classification Search
CPC ......... B23P 21/004; B23P 19/04; B23P 19/00; B23P 21/00; G05B 19/042; G05B 19/418;
(Continued)

(56) References Cited

U.S. PATENT DOCUMENTS

| 4,827,598 A | 5/1989 | Sakamoto et al. |
| 5,186,303 A * | 2/1993 | Seto .............. G05B 19/4015 198/345.1 |

(Continued)

FOREIGN PATENT DOCUMENTS

| EP | 0 232 999 A2 | 8/1987 |
| JP | 59-064257 A | 4/1984 |

(Continued)

OTHER PUBLICATIONS

Notice of Reasons for Rejection of Japanese Application No. 2015-247313 dated Aug. 8, 2017.
(Continued)

*Primary Examiner* — Rick K Chang
(74) *Attorney, Agent, or Firm* — Sughrue Mion, PLLC

(57) ABSTRACT

Provided is a production line that includes a conveying section (2) for conveying a plurality of pallets (8 and 8) along a loop-shaped circulation route, a workpiece setting section (3) for setting workpieces on the pallets (8 and 8), a setting-position measuring section (4) for measuring setting position of the workpiece on the pallets (8 and 8), a production process performing section (5) for performing one or multiple production processes at each of a plurality of locations on the circulation route for the workpieces on the pallets (8 and 8), and a workpiece extracting section (6) for extracting workpieces for which the production processes have been performed from the pallets (8 and 8). At least two of the production processes in the production process performing section (5) are performed while taking into account the setting positions of the workpieces on the pallets (8) measured by the setting-position measuring section (4).

7 Claims, 1 Drawing Sheet

(51) Int. Cl.
*B23P 19/04* (2006.01)
*G05B 19/042* (2006.01)

(58) Field of Classification Search
CPC .. G05B 2219/2621; Y02P 90/28; Y02P 90/12; Y02P 90/02
See application file for complete search history.

(56) References Cited

U.S. PATENT DOCUMENTS

| | | | |
|---|---|---|---|
| 5,347,700 A | 9/1994 | Tominaga et al. | |
| 5,910,894 A | 6/1999 | Pryor | |
| 6,153,853 A | 11/2000 | Maruyama et al. | |
| 2002/0157241 A1* | 10/2002 | Yamamoto | B23P 21/004 29/705 |
| 2008/0289175 A1 | 11/2008 | Inoue et al. | |
| 2011/0234789 A1* | 9/2011 | Koike | G05B 19/402 348/95 |
| 2011/0235054 A1* | 9/2011 | Koike | B25J 9/1697 356/620 |
| 2014/0079524 A1* | 3/2014 | Shimono | B25J 9/1669 414/796.9 |
| 2015/0225104 A1* | 8/2015 | Reed | B65C 1/028 347/110 |
| 2018/0029797 A1* | 2/2018 | Hance | B65G 1/1373 |

FOREIGN PATENT DOCUMENTS

| | | |
|---|---|---|
| JP | 63-272433 A | 11/1988 |
| JP | 07-015187 A | 1/1995 |
| JP | 07-022787 A | 1/1995 |
| JP | 11-121992 A | 4/1999 |
| JP | 2003-086995 A | 3/2003 |
| JP | 2003-170319 A | 6/2003 |
| JP | 2008-055531 A | 3/2008 |
| JP | 2008-294033 A | 12/2008 |
| JP | 2009-023013 A | 2/2009 |
| JP | 2010-056143 A | 3/2010 |
| JP | 2013-180597 A | 9/2013 |
| JP | 2015-216283 A | 12/2015 |

OTHER PUBLICATIONS

Notice of Allowance of Japanese Application No. 2015-247313 dated Jan. 16, 2018.
International Search Report of PCT/JP2016/087553 dated Mar. 21, 2017 [PCT/ISA/210].
Communication dated Jun. 19, 2019 from European Patent Office in counterpart EP Application No. 16875778.9.

* cited by examiner

PRODUCTION LINE

CROSS REFERENCE TO RELATED APPLICATIONS

This application is a National Stage of International Application No. PCT/JP2016/087553, filed Dec. 16, 2016, claiming priority based on Japanese Patent Application No. 2015-247313, filed Dec. 18, 2015.

TECHNICAL FIELD

The present invention relates to a production line that conveys a plurality of pallets for setting workpieces along a predetermined route, and sequentially performs a plurality of production processes such as assembly, processing, and so on, of components on the workpiece that are set on each pallet.

TECHNICAL BACKGROUND

As a production line for producing target products, a production line that conveys a plurality of pallets for setting workpieces (intermediates of the target products) along a loop-shaped circulation route and sequentially performs a plurality of production processes (assembly, processing, etc. of components) on the workpiece that is set on each pallet is known (e.g., see Patent Documents 1 and 2).

Each pallet has a holding shape (a bracket or the like) for setting (holding) the workpiece, but it is not usually manufactured with high precision. For this reason, positioning precision of the workpiece by the holding shape is not high, and a setting position of the workpiece on the pallet is slightly different for each pallet. Therefore, in the aforementioned production line of the related art, with regard to the production process required to be performed after an accurate setting position of the workpiece on the pallet is identified among the production processes, when the production process is performed, the accurate setting position of the workpiece on the pallet is measured using an expensive camera (an image processor) or a sensor However, in this production line of the related art, there is a problem that, depending on the number of production processes that are performed after the accurate setting position of the workpiece on the pallet is identified, the number of expensive cameras or sensors for measuring the accurate setting position of the workpiece on the pallet is increased.

RELATED ART DOCUMENTS

Patent Document

Patent Document 1
 Japanese Patent Application, Publication No. 2003-170319
Patent Document 2
 Japanese Patent Application, Publication No. 2009-23013

SUMMARY OF INVENTION

Technical Problem

An aspect of the present invention is directed to providing a production line that is advantageous for simplification of a constitution and a reduction in cycle time.

Solution to Problem

In an aspect of the present invention, a production line includes a conveying apparatus, a workpiece setting section, a setting-position measuring section, a production process performing section, and a workpiece extracting section. The conveying apparatus conveys a plurality of pallets on which workpieces (intermediates of target products) are set along a predetermined route. The workpiece setting section is provided at a part of the route, and is for setting the workpieces on the pallets. Work of setting the workpieces on the pallets in this way can be manual work of a worker or automatic work of a robot. The setting-position measuring section is provided at a part of the route (e.g., on a downstream side of the workpiece setting section in a direction in which the pallets are conveyed), and is for measuring setting positions of the workpieces on the pallets. The production process performing section is provided at a part of the route (e.g., on a downstream side of the setting-position measuring section in the direction in which the pallets are conveyed), and is for performing a plurality of production processes (assembly, processing, etc. of components) on the workpiece on each of the pallets. The workpiece extracting section is provided at a part of the route, and is for extracting the workpieces on which the production processes are performed (including a finished target product) from each of the pallets. The production line is configured to perform at least two of the production processes for the workpieces on the pallets in the production process performing section while taking into account the setting positions of the workpieces on the pallets which are measured by the setting-position measuring section.

In the production line, the predetermined route may be set as a loop-shaped circulation route or a non-loop-shaped route.

The production line may further include a controller. Each of the pallets have its own identifier attached thereto. The setting-position measuring section may read the identifiers of the pallets, measure the setting positions of the workpieces on the pallets, and transmit information about the read identifiers and the measured setting positions of the workpieces to the controller as production information about the pallets. The controller may transmit at least the information about the setting position of the workpiece among the production information about each of the pallets received from the setting-position measuring section to the production process performing section. The production process performing section may read the identifier of each of the pallets when performing each of the at least two of the production processes, receive the information about the setting position of the workpiece corresponding to the read identifier from the controller, and perform each of the production processes on the workpiece on each of the pallets in consideration of the received setting position.

In another aspect of the present invention, a production line includes: a conveying section configured to convey pallets along a predetermined route; a first section provided at a part of the route and configured to set workpieces on the pallets; a second section provided at a part of the route and configured to acquire position information about the pallets for the workpieces set on the pallets; a third section provided at a part of the route and configured to have a plurality of process units and to perform a production process on the workpieces set on the pallets in each of the plurality of process units on the basis of the position information; and a fourth section provided at a part of the route and configured to extract the workpieces from the pallets.

Advantageous Effects of Invention

According to the aspect of the present invention, the number of measurements of the setting position of the workpiece on the pallet can be smaller than the number of production processes that are performed after the accurate setting position of the workpiece on the pallet is identified. That is, the production line is configured to perform at least two of the production processes for the workpieces on the pallets in the production process performing section while taking into account the setting position of the workpiece on the pallet measured by the setting-position measuring section (after the accurate setting position is identified). For this reason, the number of measurements of the setting position of the workpiece on the pallet can be smaller than the number of production processes that are performed after the accurate setting position of the workpiece on the pallet is identified. Therefore, in comparison with a conventional production line that measures the setting position of the workpiece on the pallet the same number of times as the number of production processes that are performed after the accurate setting position of the workpiece on the pallet is identified, the production line can suppress the number of expensive cameras (image processors) or sensors for measuring the setting position, and reduce a cycle time.

DESCRIPTION OF EMBODIMENTS

One Example of Embodiment

One example of an embodiment of the present invention will be described with reference to FIGS. 1 and 2.

Figure 1:
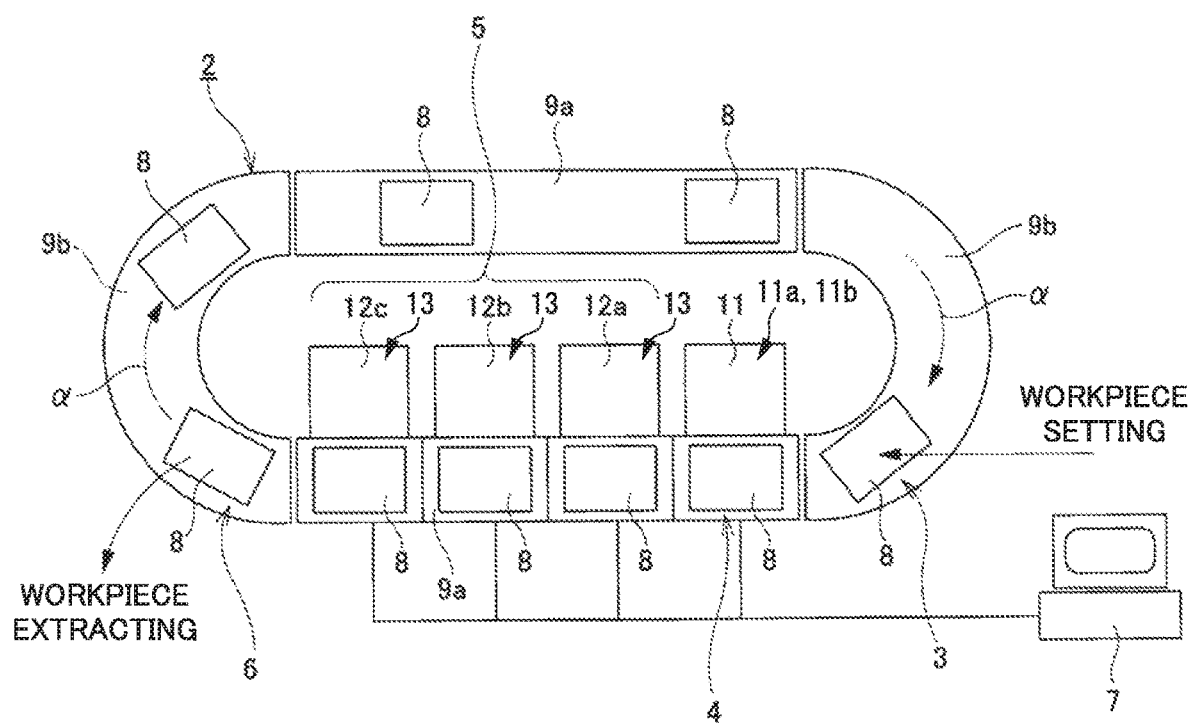
FIG. 1 is a view schematically showing a production line of one example of an embodiment of the present invention.
Figure 2:
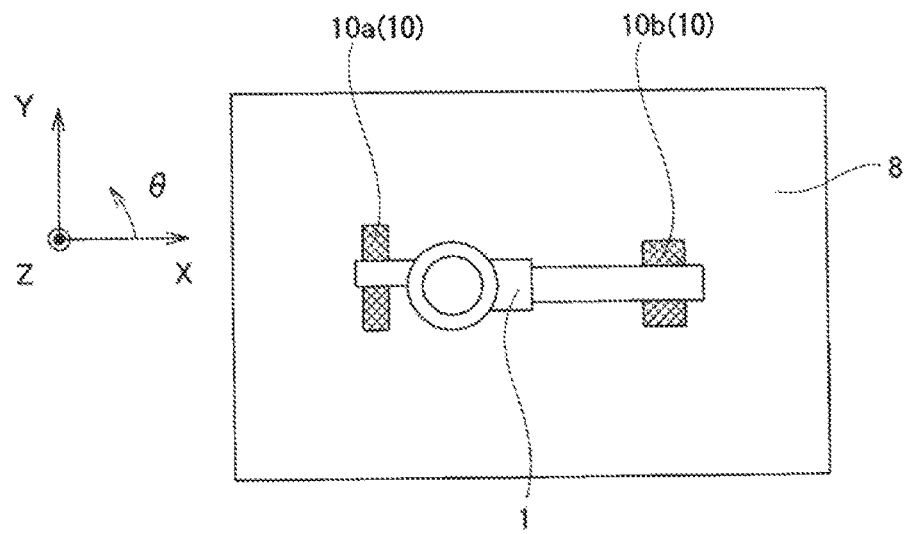
FIG. 2 is a schematic view from above of a pallet on which a workpiece is set.

FIG. 1 schematically shows a production line of this example. The production line of this example sequentially performs a plurality of production processes such as assembly, processing, etc. of components on a workpiece 1 that is an intermediate of a target product (see FIG. 2, not shown in FIG. 1), and includes a conveying apparatus 2, a workpiece setting section (a first section) 3, a setting-position measuring section (a second section) 4, a production process performing section (a third section) 6, workpiece extracting section (a fourth section) 6, and a controller (a control device) 7. In an example, the production line is intended for products produced via a plurality of treatment processes performed on the basis of position information. For example, the target products may include various bearings, components for vehicles, and products for precision machines.

The conveying apparatus (a conveying device) 2 conveys a plurality of pallets 8 and 8, on each of which the workpiece 1 is set, along a circulation route in a loop shape (in the shown example, an oval shape like a track in an athletic field) in a direction of an arrow a of FIG. 1. In the case of this example, this conveying apparatus 2 is formed by combining a plurality of conveyors (a pair of linear conveyors 9a and 9a and a pair of semicircular conveyors 9b and 9b) in a loop shape. Each of the pallets 8 and 8 is placed on one of the conveyors 9a and 9b.

In one example, each of the pallets 8 and 8 is made of a synthetic resin, a metal, or the like. In another example, each of the pallets is formed of another material. As shown in FIG. 2, the pallet 8 has a holding shape (a holding section, a supporting section, a positioning section, and a positioning mechanism) 10 for setting (holding) the workpiece 1 on the top thereof. For example, the holding shape 10 includes brackets 10a and 10b or the like as indicated by a diagonal lattice in FIG. 2. In the case of this example, the holding shape of each of the pallets 8 and 8 has an error to some extent (e.g., there is a mounting error of about 0.2 to 0.5 mm at a position of each of the brackets 10a and 10b within the pallet 8). For this reason, positioning precision of the workpiece 1 (positioning precision of the workpiece 1 for a reference position on the pallet 8) is relatively low due to the holding shape 10. In one example, as the reference position of the pallet 8, a corner of the pallet 8 (e.g., a bottom-left corner of the pallet 8 in FIG. 2) may be set as an origin. In addition, an X axis may be set in parallel to an edge of a lower end of the pallet 8, and a Y axis may be set to be perpendicular to the X axis. Setting positions of the workpieces 1 on the pallets 8 and 8 are slightly different between the plurality of pallets 8 and 8. Each of the pallets 8 and 8 has an ID attached to a part thereof as its own identifier by printing, affixture, or the like in a state in which a bar code, an IC tag, or the like that is not shown can be automatically read by a reading machine (a bar code reader, an IC reader, etc.).

The workpiece setting section (the first section) 3 is provided at a part of the loop-shaped circulation route (in the shown example, at a downstream end of the semicircular conveyor 9b at a right end of FIG. 1). In this workpiece setting section 3, the workpiece 1 is set with respect to (the brackets 10a and 10b of) the pallet 8 conveyed by the conveying apparatus 2 by manual work of a worker or automatic work of a robot.

The setting-position measuring section (the second section) 4 is provided at a part of the loop-shaped circulation route at a position adjacent to a downstream side of the workpiece setting section 3 (in the shown example, at an upstream end of the linear conveyor 9a on a lower side of FIG. 1). This setting-position measuring section 4 includes a setting-position measuring device 11. In one example, the setting-position measuring device 11 has a positioning section (a first positioning mechanism) 11a for positioning the pallet 8 at a predetermined position on a base, and a position information acquiring section 11b that acquires information about a position (and posture) of the workpiece 1 for the pallet 8 (a predetermined reference in the pallet 8). Positioning precision of the positioning section (the first positioning mechanism) 11a is higher than that of the workpiece 1 for the pallet 8 in the workpiece setting section (the first section) 3. As the positioning section 11a, various mechanisms capable of positioning the pallet with relatively high precision can be applied. For example, the positioning section 11a may have a stopper against which the pallet 8 abuts. Positioning using the stopper is advantageous for simplification of a constitution and a reduction in cycle time. The setting-position measuring device 11 stops the pallet 8 conveyed by the conveying apparatus 2 by abutting against the stopper, and positions the pallet 8 with high precision (e.g., with an error of 0.1 mm or less). In this state, the setting position of the workpiece 1 on the pallet 8 (a position error that is a deviation from a proper position) is automatically measured. To be specific, for example, a position error (position information) of a horizontal direction (a leftward/rightward direction X, an upward/downward direction Y, and a rotational direction θ in FIG. 2) is measured by a camera (an image processor), and a position error (position information) of a vertical direction (a forward/backward direction Z in FIG. 2) is measured by a contactless distance sensor such as a laser. The setting-position measuring device 11 automatically reads the ID attached to a part of the pallet 8 by means of the reading machine (the bar code reader, the IC reader, or the like). The setting-position measuring device 11 transmits information (position information) about the ID read in this way and the measured setting position of the workpiece 1 to the controller 7 as a part of production information about the pallet 8. The controller 7 stores the production information about each of the pallets 8 received from the setting-position measuring device 11 in its own storage area or an external storage area. The positioning of the pallet 8 caused by the setting-position measuring device 11 is rapidly released after the reading of the ID of the pallet 8 and the measurement of the position of the workpiece on the pallet 8 are completed, and the pallet 8 is conveyed downstream again by the conveying apparatus 2. A marking (a cross, a two-dimensional bar code, etc.) acting as a reference for measuring the setting position of the workpiece 1 may be attached to a part of each of the pallets 8 and 8.

The production process performing section (the third section) 5 is provided at a part of the loop-shaped circulation route at a position adjacent to a downstream side of the setting-position measuring section 4 (in the shown example, at the remaining portion excluding the upstream end of the linear conveyor 9a on the lower side of FIG. 1). This production process performing section 5 includes a set of production process performing devices units or process devices) 12a, 12b and 12c that are provided at a plurality of locations (in the shown example, three locations) on the circulation route. Each of the plurality of production process performing devices (the process units) 12a, 12b and 12c in the production process performing section (the third section) 5 has a positioning section (a second positioning mechanism) 13 that is configured to position the pallet 8 in each of the devices (the units) 12a, 12b and 12c. One or multiple production processes (assembly, processing, etc. of components) are automatically performed on the workpiece 1 on the pallet 8 conveyed by the conveying apparatus 2 in sequence by the production process performing devices 12a, 12b and 12c. The production process is performed on the workpiece 1 set on the pallet 8 in each of the plurality of production process performing devices (the process units or the process devices) 12a, 12b and 12c on the basis of the position information acquired by the setting-position measuring section (the second section) 4. Positioning precision of the positioning section (the second positioning mechanism) 13 is higher than that of the workpiece 1 for the pallet 8 in the workpiece setting section (the first section) 3. As the positioning section 13, various mechanisms capable of positioning the pallet with relatively high precision can be applied. For example, the positioning section 13 may have a stopper against which the pallet 8 abuts. Positioning using the stopper is advantageous for simplification of a constitution and a reduction in cycle time. For example, each of the production process performing devices 12a, 12b and 12c stops the pallet 8 conveyed by the conveying apparatus 2 by abutting against the stopper, and positions the pallet 8 with high precision (e.g., with an error of 0.1 mm or less). At this point, a position of the workpiece 1 on the pallet 8 includes a position error. In this state, one or multiple production processes are automatically performed on the workpiece 1 on the pallet 8. Then, the positioning of the pallet 8 is rapidly released, and the pallet 8 is conveyed downstream again by the conveying apparatus 2.

Especially, in the case of this example, any of the production process performing devices 12a, 12b and 12c performs the production process to be performed after an accurate setting position of the workpiece 1 on the pallet 8 is identified among one or multiple production processes for the workpiece 1 on the pallet 8 while considering the setting position of the workpiece 1 on the pallet 8 which is measured by the setting-position measuring device 11. For example, a position set as a target when a robot hand or an actuator performing the processing and the assembly of the components is operated is corrected on the basis of the position information of the workpiece 1. For this reason, in the case of this example, any of the production process performing devices 12a, 12b and 12c automatically reads the ID attached to a part of the pallet 8 positioned as described above by means of the reading machine (the bar code reader, the IC reader, etc.). The ID read in this way is sent to the controller 7, and thereby the information about the setting position of the workpiece 1 which is stored in a storage area of the controller 7 and corresponds to the ID is received. Alternatively, the information about the setting position of the workpiece 1 which is acquired by the reading machine and corresponds to the ID is previously received from the controller 7, and is acquired from the production information about each of the pallets 8 (the information about the ID and the setting position of the workpiece 1) which is stored in its own storage area. The production process to be performed after the accurate setting position of the workpiece 1 on the pallet 8 is identified is performed while considering a result of measuring the setting position of the workpiece 1 on the pallet 8 which is acquired in this way.

The workpiece extracting section 6 is provided at a part of the loop-shaped circulation route at a position adjacent to a downstream side of the production process performing section 5 (in the shown example, at an upstream end of the semicircular conveyor 9b at a left end of FIG. 1). In this workpiece extracting section 6, the workpiece 1 (including the finished target product) on which each production process is performed is extracted from each of the pallets 8 and 8 conveyed by the conveying apparatus 2 by manual work of a worker or automatic work of a robot.

According to the production line of this example configured as described above, the number of measurements of the setting position of the workpiece 1 on the pallet 8 can be smaller than the number of production processes that are performed after the accurate setting position of the workpiece 1 on the pallet 8 is identified. To be more specific, regardless of the number of production processes that are performed after the accurate setting position of the workpiece 1 on the pallet 8 is identified, the number of measurements of the setting position of the workpiece 1 on the pallet 8 can be set to one.

That is, in the case of the production line of this example, any of the production process performing devices 12a, 12b and 12c performs the production process to be performed after the accurate setting position of the workpiece 1 on the pallet 8 is identified among one or multiple production processes for the workpiece 1 on the pallet 8 while considering the setting position of the workpiece 1 on the pallet 8 which is measured by the setting-position measuring device 11. For this reason, regardless of the number of production processes that are performed after the accurate setting position of the workpiece 1 on the pallet 8 is identified, the number of measurements of the setting position of the workpiece 1 on the pallet 8 can be set to one.

Therefore, in the case of the production line of this example, in comparison with a conventional production line that measures the setting position of the workpiece 1 on the pallet 8 the same number of times as the number of production processes that are performed after the accurate setting position of the workpiece 1 on the pallet 8, the number of expensive cameras (image processors) or sensors for measuring the setting position can be suppressed, and the cycle time can reduced. The production line of this example is advantageous for the simplification of the configuration and the reduction of the cycle time.

The predetermined route along which the conveying apparatus conveys the plurality of pallets is not limited to the loop-shaped circulation route, and may be a non-loop-shaped route. When the predetermined route is set as the non-loop-shaped route, for example the pallets are supplied from an upstream end of the route, and are collected at a downstream end of the route.

EXPLANATION OF NUMERALS AND CHARACTERS

1 Workpiece
2 Conveying apparatus (conveying section)
3 Workpiece setting section (first section)
4 Setting-position measuring section (second section)
5 Production process performing section (third section)
6 Workpiece extracting section (fourth section)
7 Controller (control device)
8 Pallet
9a, 9b Conveyor
10a, 10b Bracket
11 Setting-position measuring device
12a, 12b, 12c Production process performing device

The invention claimed is:
1. A production line comprising:
a conveyor that conveys a plurality of pallets along a predetermined route while the pallets are placed on the conveyor, a bracket being mounted on each of the plurality of pallets;
a workpiece setting section, provided at a part of the route, where a workpiece is set with respect to the bracket on the pallet manually or automatically;
a setting-position measuring section provided at a part of the route and that measures a position error of the workpiece in horizontal and vertical directions while the pallet is placed on the conveyor, the position error including a mounting error of the bracket relevant to the pallet and corresponding to a deviation from a proper position of the workpiece relevant to the pallet;
a production process performing section provided at a part of the route and that performs a plurality of production processes on the workpiece on the pallet while the pallet is placed on the conveyor; and
a workpiece extracting section, provided at a part of the route, where the workpiece, on which each of the production processes is performed, is extracted from each of the pallets manually or automatically,
wherein at least two of the production processes for the workpiece on the pallet in the production process performing section are performed while taking into account the position error relevant to the pallet which is measured by the setting-position measuring section and without measuring again the position error relevant to the pallet.
2. The production line according to claim 1, further comprising a controller,
wherein each of the pallets has an own identifier attached thereto,
the setting-position measuring section reads the identifier of each of the pallets, measures the position error relevant to each of the pallets, and transmits information about the read identifier and the measured position error to the controller as production information about each of the pallets,
the controller transmits at least the information about the position error among the production information about each of the pallets received from the setting-position measuring section to the production process performing section, and
the production process performing section reads the identifier of the pallet when performing each of the at least two of the production processes, receives the information about the position error corresponding to the read identifier from the controller, and performs each of the production processes on the workpiece on the pallet in consideration of the received position error.
3. The production line according to claim 1, wherein the production process performing section performs the plurality of production processes on the workpiece on the pallet placed on the conveyor in a state in which the pallet is stopped by abutting against a stopper to position the workpiece.
4. A production line comprising:
a conveyer that conveys pallets along a predetermined route, a bracket being mounted on each of the pallets;
a first section, provided at a part of the route, where a workpiece is set with respect to the bracket on the pallet manually or automatically;
a second section provided at a part of the route and that acquires position information about the pallet for the workpiece set on the pallet, the position information including a position error of the workpiece in horizontal and vertical directions that is acquired by the second section while the pallet is placed on the conveyer, the position error including a mounting error of the bracket relevant to the pallet and corresponding to a deviation from a proper position of the workpiece relevant to the pallet;
a third section provided at a part of the route and that has a plurality of process units and to perform a production process on the workpiece set on the pallet in each of the plurality of process units on the basis of the position information while the pallet is placed on the conveyer; and
a fourth section provided at a part of the route, where the workpiece is extracted from the pallet manually or automatically,
wherein the plurality of processes for the workpiece on the pallet in the third section are performed while taking into account the position error relevant to the pallet which is acquired by the second section and without measuring again the position error relevant to the pallet.
5. The production line according to claim 4, wherein:
the second section has a first positioning mechanism that positions the pallet in the second section; and
each of the plurality of process units in the third section has a second positioning mechanism that positions the pallet in each of the plurality of process units.
6. The production line according to claim 5, wherein positioning precision of the first positioning mechanism and positioning precision of the second positioning mechanism are higher than positioning precision of the workpiece for the pallet in the first section.
7. The production line according to claim 5, wherein each of the first positioning mechanism and the second positioning mechanism has a stopper against which the pallet abuts.

* * * * *